US012600183B2

(12) United States Patent
Castro et al.

(10) Patent No.: US 12,600,183 B2
(45) Date of Patent: Apr. 14, 2026

(54) METHOD FOR DETERMINING POSITION OF A TRAILER AND DEVICE FOR DETERMINING POSITION OF A TRAILER

(71) Applicant: AUMOVIO Autonomous Mobility US, LLC, Auburn Hills, MI (US)

(72) Inventors: Aranza Hinojosa Castro, Libert Hill, TX (US); Alberto Ramirez-Mendez, Lake Orion, MI (US)

(73) Assignee: AUMOVIO Autonomous Mobility US, LLC, Auburn Hills, MI (US)

( * ) Notice: Subject to any disclaimer, the term of this patent is extended or adjusted under 35 U.S.C. 154(b) by 621 days.

(21) Appl. No.: 18/149,095

(22) Filed: Dec. 31, 2022

(65) Prior Publication Data

US 2024/0217283 A1    Jul. 4, 2024

(51) Int. Cl.
B60D 1/36        (2006.01)
B60D 1/62        (2006.01)
(52) U.S. Cl.
CPC    B60D 1/36 (2013.01); B60D 1/62 (2013.01)
(58) Field of Classification Search
CPC ................................... B60D 1/36; B60D 1/62
See application file for complete search history.

(56) References Cited

U.S. PATENT DOCUMENTS

| | | | |
|---|---|---|---|
| 7,225,891 B2 | 6/2007 | Gehring et al. | |
| 9,085,261 B2 | 7/2015 | Lu et al. | |
| 10,017,115 B2 | 7/2018 | Lavoie | |
| 10,259,390 B2 | 4/2019 | Zhang et al. | |
| 10,960,721 B2* | 3/2021 | Niewiadomski | B60R 1/003 |
| 11,030,476 B2* | 6/2021 | Xu | H04N 7/188 |
| 2014/0218506 A1* | 8/2014 | Trombley | B62D 15/027 |
| | | | 348/113 |
| 2015/0321666 A1* | 11/2015 | Talty | B60W 30/00 |
| | | | 701/41 |
| 2018/0276838 A1 | 9/2018 | Gupta et al. | |
| 2019/0373152 A1* | 12/2019 | Tan | A47G 1/02 |
| 2022/0314884 A1* | 10/2022 | Uppara | B60R 1/105 |

* cited by examiner

*Primary Examiner* — Valentin Neacsu
*Assistant Examiner* — Marlon A Arce

(57)        ABSTRACT

According to various embodiments, a method for determining position of a trailer may include generating an input image of a first vehicle using a camera mounted on a second vehicle. The input image may capture a feature of the first vehicle. One of the first vehicle and the second vehicle may be a trailer, while the other vehicle of the first vehicle and the second vehicle may be a towing vehicle coupled to the trailer. The method may further include determining a pixel position of the feature in the input image, using a processor. The method may further include determining position of the first vehicle relative to the second vehicle based on the pixel position of the feature in the input image, using the processor.

17 Claims, 6 Drawing Sheets

200

202

Generate an input image of a first vehicle using a camera mounted on a second vehicle, wherein the input image captures a feature of the first vehicle.

204

Determine a pixel position of the feature in the input image, using a processor.

206

Determine position of the first vehicle relative to the second vehicle based on the pixel position of the feature in the input image, using the processor.

FIG. 2

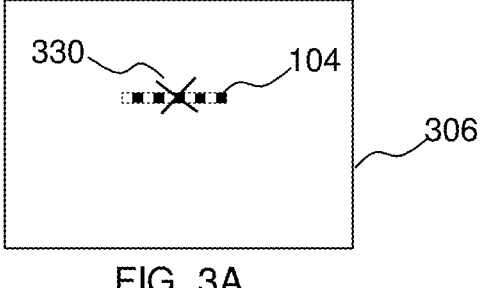

FIG. 3A

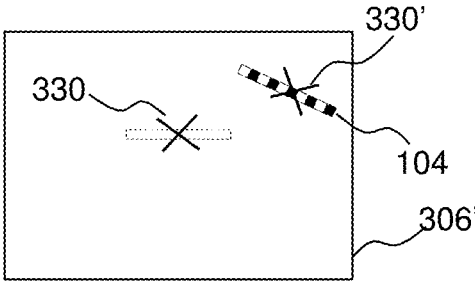

FIG. 3B

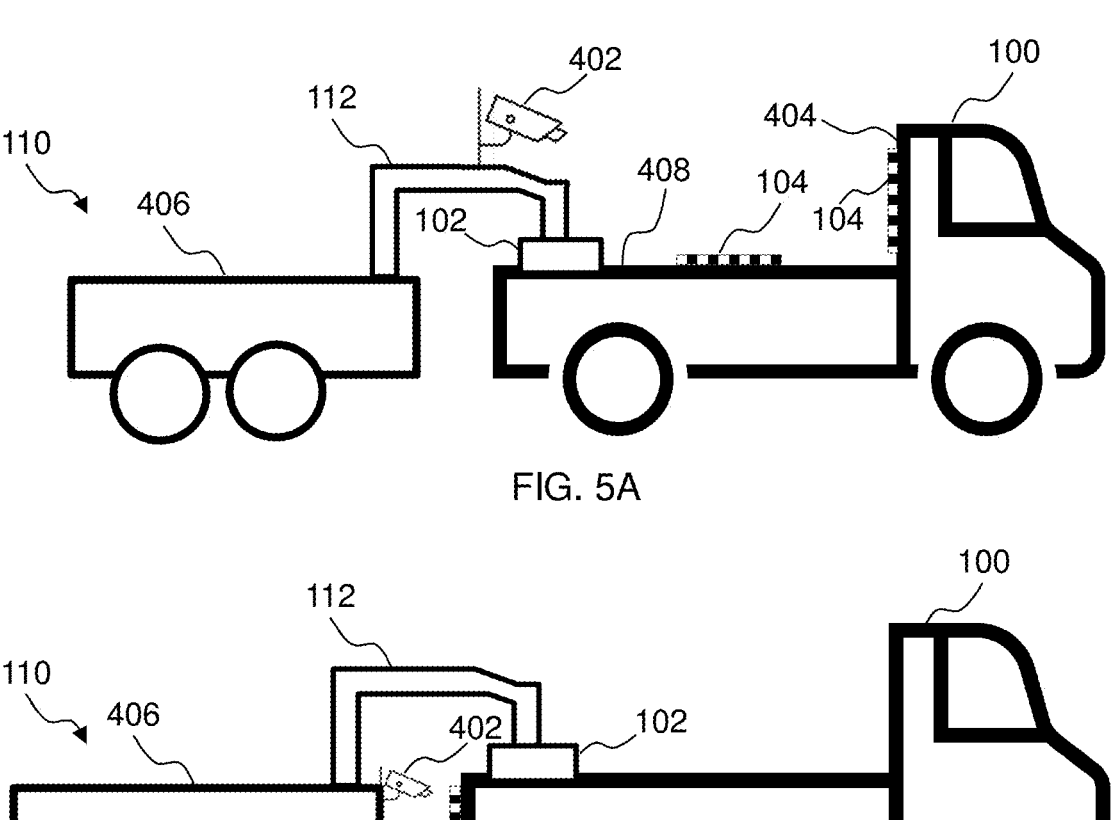
FIG. 5A
FIG. 5B
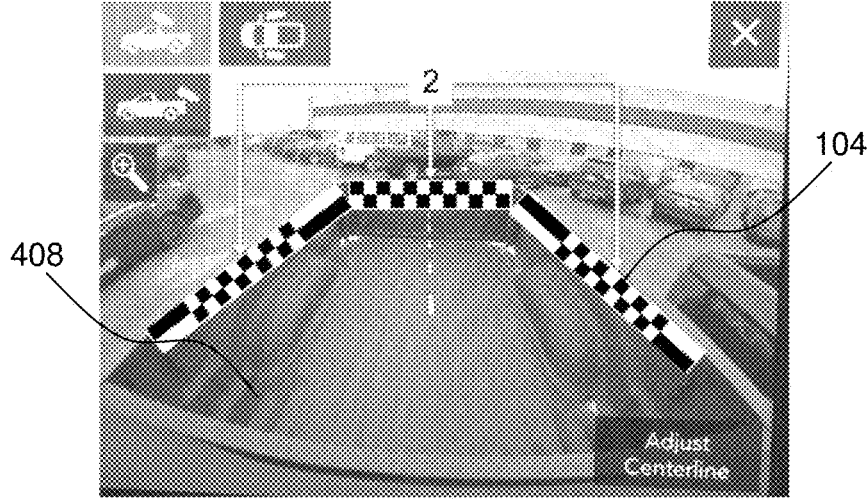
FIG. 6

700

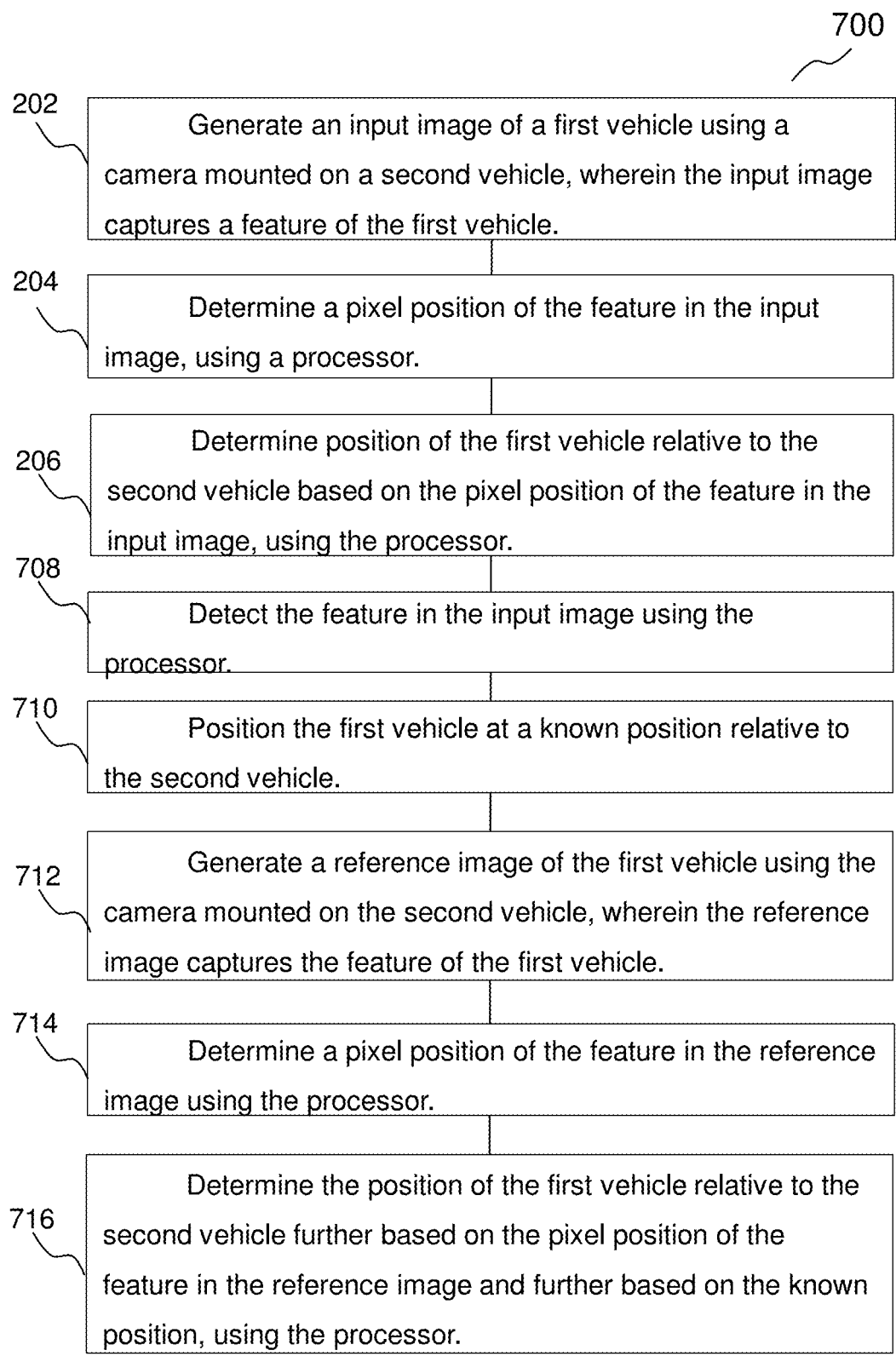

202

Generate an input image of a first vehicle using a camera mounted on a second vehicle, wherein the input image captures a feature of the first vehicle.

204

Determine a pixel position of the feature in the input image, using a processor.

206

Determine position of the first vehicle relative to the second vehicle based on the pixel position of the feature in the input image, using the processor.

708

Detect the feature in the input image using the processor.

710

Position the first vehicle at a known position relative to the second vehicle.

712

Generate a reference image of the first vehicle using the camera mounted on the second vehicle, wherein the reference image captures the feature of the first vehicle.

714

Determine a pixel position of the feature in the reference image using the processor.

716

Determine the position of the first vehicle relative to the second vehicle further based on the pixel position of the feature in the reference image and further based on the known position, using the processor.

FIG. 7

METHOD FOR DETERMINING POSITION OF A TRAILER AND DEVICE FOR DETERMINING POSITION OF A TRAILER

TECHNICAL FIELD

Various embodiments relate to methods and devices for determining position of a trailer. Various embodiments relate to vehicles, in particular, towing vehicles or trailers.

BACKGROUND

Trailers are unpowered vehicles which may be towed by a powered vehicle, also referred to as a towing vehicle. Trailers may be useful commercially for transporting goods, and may even be used as mobile homes. A towing vehicle, such as a truck, may include a hitch for coupling to the trailer. Common types of hitches include ball and socket, fifth wheel and gooseneck. The trailer may include a trailer coupler that secures to the hitch of the towing vehicle. The ball and socket hitch may be connected to the rear of the towing vehicle at the frame or the bumper. The fifth wheel and gooseneck hitch may be attached to the truck bed. Maneuvering a trailer may be challenging for the driver of the towing vehicle for several reasons—the trailer may obscure the driver's rear view, and the trailer does not turn immediately following a turn by the towing vehicle given that it is typically rotatably coupled to the towing vehicle. The driver of the towing vehicle needs to know the position of the trailer to avoid collisions or being trapped in a tight corner, especially when making tight turns or when reversing the trailer. As such, a method for determining the position of the trailer is required.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to various embodiments, a method for determining position of a trailer may be provided. The method may include generating an input image of a first vehicle using a camera mounted on a second vehicle. The input image may capture a feature of the first vehicle. One of the first vehicle and the second vehicle may be a trailer, while the other vehicle of the first vehicle and the second vehicle may be a towing vehicle coupled to the trailer. The method may further include determining a pixel position of the feature in the input image, using a processor. The method may further include determining position of the first vehicle relative to the second vehicle based on the pixel position of the feature in the input image, using the processor.

According to various embodiments, a device for determining position of a trailer may be provided. The device may include a camera and a processor. The camera may be mountable on a second vehicle coupled to a first vehicle. One of the first vehicle and the second vehicle may be a trailer, and the other vehicle of the first vehicle and the second vehicle may be a towing vehicle configured to tow the trailer. When in use, the camera may be configured to generate an input image of the first vehicle. The input image may capture a feature of the first vehicle. The processor may be configured to determine a pixel position of the feature in the input image. The processor may be further configured to determine position of the first vehicle relative to the second vehicle based on the pixel position of the feature in the input image.

According to various embodiments, a vehicle for coupling to a further vehicle may be provided. The vehicle may include a camera configured to generate an input image of a further vehicle when the further vehicle is coupled to the vehicle. The vehicle may further include a processor configured to determine a pixel position of a feature in the input image. The processor may be further configured to determine position of the further vehicle relative to the vehicle based on the pixel position of the feature in the input image. The vehicle may be one of a trailer towable by the further vehicle and a towing vehicle configured to tow the further vehicle.

Other objects, features and characteristics, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the non-limiting embodiments of the disclosure, are intended for purposes of illustration only and are not intended to limit the scope of the disclosure.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The present disclosure will become more fully understood from the detailed description and the accompanying drawings, wherein:

FIG. 2 shows a flow diagram of a method of determining position of a trailer according to various embodiments.

FIGS. 3A and 3B show examples of images captured by the camera according to various embodiments.

FIGS. 5A to 5B show examples of the positioning of the camera according to various embodiments.

FIG. 6 shows a partial photograph of a towing vehicle according to various embodiments.

FIG. 7 shows a flow diagram of a method for determining position of a trailer according to various embodiments.

DESCRIPTION

Figure 1A:
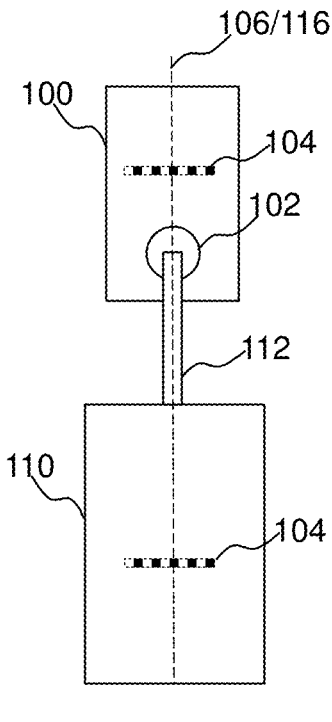
FIGS. 1A and 1B show top views of a towing vehicle and a trailer according to various embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

Embodiments described below in context of the devices are analogously valid for the respective methods, and vice versa. Furthermore, it will be understood that the embodiments described below may be combined, for example, a part of one embodiment may be combined with a part of another embodiment.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

In this context, the device as described in this description may include a memory which is for example used in the processing carried out in the device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In order that the invention may be readily understood and put into practical effect, various embodiments will now be described by way of examples and not limitations, and with reference to the figures.

Figure 1B:
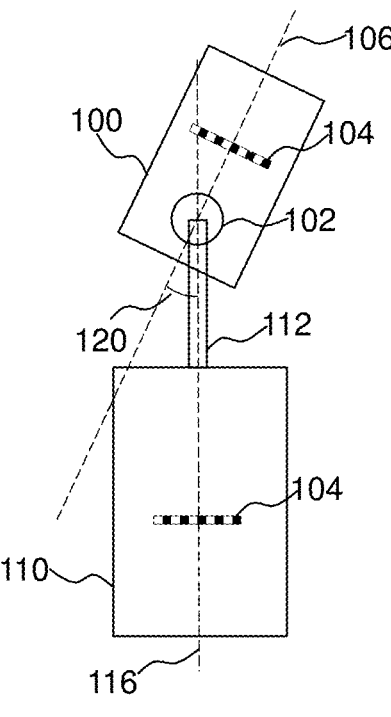

FIGS. 1A and 1B show top views of a towing vehicle 100 and a trailer 110 according to various embodiments. The towing vehicle 100 may be coupled to the trailer 110 for towing the trailer 110. The towing vehicle 100 may be for example, a truck. The towing vehicle 100 may include a hitch 102, for example, a ball hitch or a fifth wheel hitch. The hitch 102 may be disposed on the bumper of the towing vehicle 100, or in the bed of the towing vehicle 100. The trailer 110 may be, for example, a flatbed trailer, or a caravan. The trailer 110 may include a trailer coupler 112. The trailer coupler 112 may be for example, a gooseneck connector or a kingpin connector. The trailer coupler 112 may be selectively engageable with the hitch 102 for coupling the trailer 110 to the towing vehicle 100. The trailer coupler 112 may be rotatably engageable with the hitch 102, such that the trailer 110 may rotate relative to the towing vehicle 100. This may allow the coupled vehicles to navigate tight corners, where there may be insufficient space to accommodate the coupled vehicles should they be rigidly coupled.

At least one of the towing vehicle 100 and the trailer 110 may include a feature 104, also referred herein as a target. The feature 104 may generically refer to any visual marker or element of the respective vehicles. The feature 104 may include a checkered ruler, a symbol, a board, or an existing portion of the vehicle such as an integral part of the vehicle.

Referring to FIG. 1A, in an alignment position, the centerline 106 of the towing vehicle 100 may be at least substantially aligned with the centerline 116 of the trailer 110. In other words, an angle between the centerline 106 and the centerline 116 is zero or nearly zero. The centerline 106 may be parallel to a lengthwise direction of the towing vehicle 100, connecting the front and rear ends of the towing vehicle 100. Similarly, the centerline 116 may be parallel to a lengthwise direction of the trailer 110, connecting the front and rear ends of the trailer 110.

Referring to FIG. 1B, when the towing vehicle 100 makes a turn, the centerline 106 may become misaligned with the centerline 116, making an angle 120 with the centerline 116. The angle 120 may be referred herein as a relative yaw angle between the vehicles. To determine the angle 120, a camera 402 (for example, shown in FIGS. 4A to 4C) mounted on either the towing vehicle 100 or the trailer 110 may capture an image of the other vehicle, and a processor 802 (for example, shown in FIGS. 8 and 9) may determine the angle 120 based on a position in the captured image, where the feature 104 appears. The process of determining the angle 120 is described further with respect to FIG. 2.

FIG. 2 shows a flow diagram of a method 200 of determining position of a trailer according to various embodiments. The method 200 may include generating an input image 306' (shown in FIG. 3B) of a first vehicle using a camera 402 mounted on a second vehicle, in 202. The input image 306' may capture a feature 104 of the first vehicle. One of the first vehicle and the second vehicle may be the trailer 110, and the other vehicle of the first vehicle and the second vehicle may be the towing vehicle 100 that is coupled to the trailer 110. In other words, in an embodiment, the first vehicle may be the trailer 110 while the second vehicle may be the towing vehicle 100. In another embodiment, the first vehicle may be the towing vehicle 100 while the second vehicle may be the trailer 110.

The method 200 may further include determining a pixel position of the feature 104 in the input image 306' using the processor 802, in 204. The pixel position may refer to a point in the input image 306' where the feature 104 appears. The pixel position may be expressed in coordinates, such as (X,Y). The pixel position may correspond to a centre point of the feature 104. The pixel position may also include the coordinates of multiple points of the feature 104, for example, the multiple points may correspond to a perimeter of the feature 104.

The processor 802 may detect the feature 104 in the input image 306', using detection techniques such as pattern recognition. The processor 802 may also include a neural network that is trained to detect the feature 104. Suitable neural networks may include convolutional neural network (CNN) and You Only Look Once (YOLO). The method 200 may further include determining position of the first vehicle relative to the second vehicle (also referred herein as determined relative position) based on the pixel position of the feature 104 in the input image 306' using the processor 802, in 206.

The processor 802 may further provide the determined relative position to a driver assistance module that assists the driver in performing maneuvers such as turning and reversing the towing vehicle 100. The determined relative position of the first vehicle may include an angle 120. The determined relative position may also include a distance between the first vehicle and the second vehicle, which the processor 802 may determine based on the angle 120 and predetermined size of the trailer 110. The processor 802 may further determine the absolute position of the first vehicle based on an absolute position of the second vehicle and further based on the determined relative position. The absolute position may be expressed in, for example, Global Positioning System coordinates. The processor 802 may receive the absolute position from a navigation sensor onboard the towing vehicle 100. The processor 802 may also fine tune the determined relative position, or determine the absolute position, based on vehicle sensor data from the towing vehicle 100. The vehicle sensor data may include for example, wheel speed, acceleration, vehicle direction.

According to various embodiments, the feature 104 may include a checkered board. Checkered boards are often used to calibrate cameras. The processor 802 may use an image taken for calibrating the camera 402, as the reference image 306.

According to various embodiments, the feature 104 may be a "target-less" feature, in other words, may be an integral part of the first vehicle. For example, the feature 104 may be a marking or pattern on the first vehicle, or may be the perimeter or edges of the first vehicle. For example, the feature 104 may be the shape of the trailer coupler 112. The feature 104 may be any recognizable part of the first vehicle, in particular, a part that is recognizable with high accuracy using the processor 802.

FIGS. 3A and 3B show examples of images captured by the camera 402 according to various embodiments. Referring to FIG. 3A, the camera 402 may generate a reference image 306 that shows the feature 104 of the first vehicle. The feature 104 may be detected in the reference image 306, either by a processor 802 using known image processing techniques, or manually by a human operator. The processor 802 may determine a reference position 330 of the detected feature 104 in the reference image 306. The reference position 330 may include a pixel position of the center of the feature 104. The reference position 330 may also include pixel positions of other parts of the feature 104, such as its border, or farthest ends. The reference image 306 may be captured when the trailer 110 is at a known position relative to the towing vehicle 100, for example, in the alignment position shown in FIG. 1A.

Referring to 3B, the camera 402 may generate an input image 306' that shows the feature 104 of the first vehicle. The processor 802 may detect the feature 104 in the input image 306'. Alternatively, a human operator may manually identify the feature 104 in the input image 306'. The processor 802 may determine a current position 330' of the feature 104 in the input image 306'. The processor 802 may compare the current position 330' to the reference position 330, and determine the current position of the trailer 110 relative to the towing vehicle 100, based on the comparison. The comparison may include at least one of rotational angle and distance, between the current position 330' and the reference position 330. The processor 802 may also compare the size of the feature 104 that appears in the input image 306' and the reference image 306.

Figure 4A:
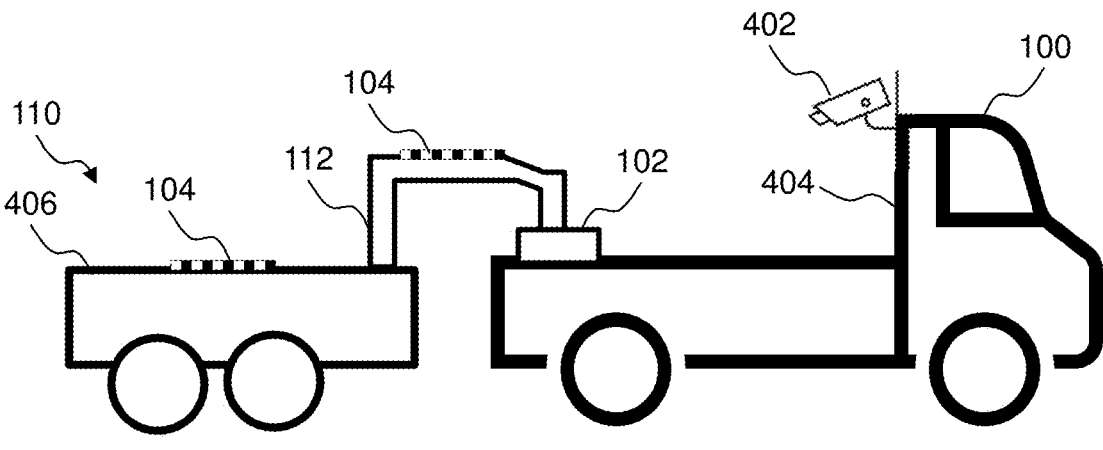
FIGS. 4A to 4C show examples of the positioning of the camera according to various embodiments.
Figure 4B:
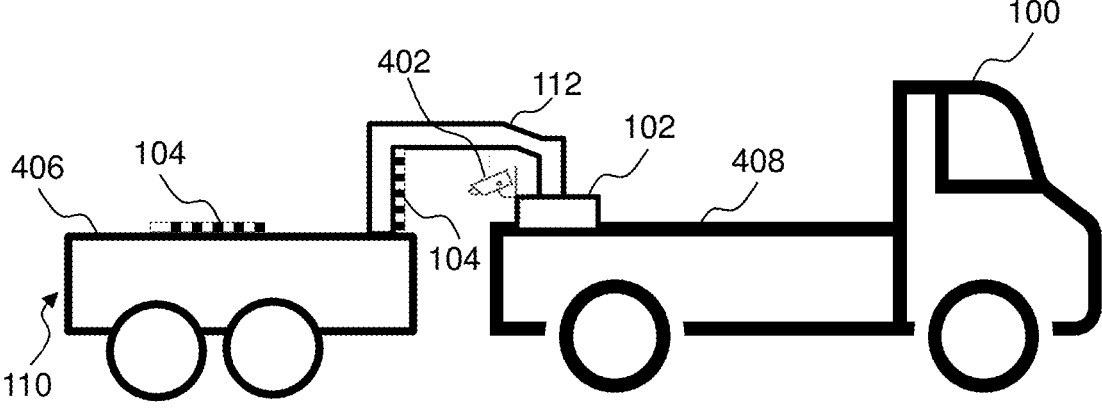
Figure 4C:
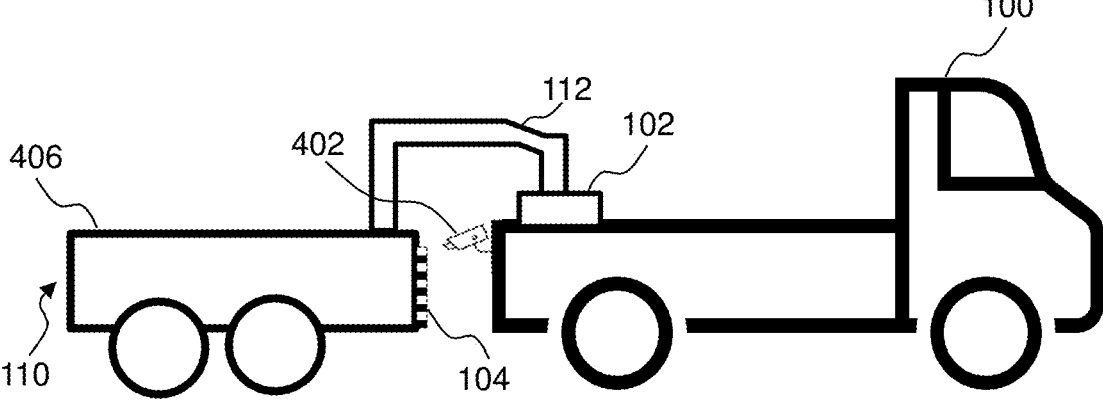

FIGS. 4A to 4C show examples of the positioning of the camera 402 according to various embodiments. In these examples, the first vehicle may be the trailer 110, while the second vehicle may be the towing vehicle 100. The camera 402 may be mounted on the towing vehicle 100, and may point towards the trailer 110. The camera 402 may be angled to take pictures of the trailer 110.

Referring to FIG. 4A, the towing vehicle 100 may include a cab 404, and the camera 402 may be positioned at a rear of the cab 404. The trailer 110 may include the trailer coupler 112 and the trailer body 406. The field of view (FOV) of the camera 402 may include at least one of the trailer coupler 112 and the trailer body 406. The images taken by the camera 402 may capture features 104 that are on the trailer coupler 112, for example, a top surface of the trailer coupler 112, or on the trailer body 406. As an example, the feature 104 may include a perimeter of the trailer body 406, or may include a visual marker mounted on the perimeter of the trailer body 406. The visual marker may include, but is not limited to, a checkered ruler. The camera 402 may be integrated with a third brake light of the towing vehicle 100, also referred to as a center high mounted stop light (CHMSL).

FIG. 4B shows an alternative arrangement of the camera 402. The camera 402 may be disposed on the hitch 102 of the towing vehicle 100. The hitch 102, for example, a fifth wheel hitch, or a gooseneck hitch, may be installed in the bed 408 of the towing vehicle 100. In this arrangement, the camera 402 may be facing the trailer coupler 112, and the feature 104 that the processor 802 determines pixel position of, may be disposed on the trailer coupler 112, or on the trailer body 406. As an example, the feature 104 may include a perimeter of the trailer body 406, or may include a visual marker mounted on the perimeter of the trailer body 406. The visual marker may include, but is not limited to, a checkered ruler. The feature 104 may alternatively, or additionally, be disposed on a front surface of the trailer coupler 112, that faces the towing vehicle 100.

FIG. 4C shows another alternative arrangement of the camera 402. The camera 402 may be mounted at a rear end of the towing vehicle 100. For example, the camera 402 may be a rear view camera of the towing vehicle 100. The feature 104 that the processor 802 determines pixel position of, may be part of a front end of the trailer 110.

FIGS. 5A to 5B show examples of the positioning of the camera 402 according to various embodiments. In these examples, the first vehicle may be the towing vehicle 100, while the second vehicle may be the trailer 110. The camera 402 may be mounted on the trailer 110, and may point towards the towing vehicle 100. The camera 402 may be angled to take pictures of the towing vehicle 100.

Referring to FIG. 5A, the camera 402 may be mounted on the trailer coupler 112. The camera 402 may be positioned to look at the bed 408 of the towing vehicle 100, or the rear end of the cab 404. The features 104 may be part of, or disposed on, the rear end of the cab 404, or the bed 408. As an example, the feature 104 may include a perimeter of the bed 408, or may include a visual marker mounted on the perimeter of the bed 408. The visual marker may include, but is not limited to, a checkered ruler.

FIG. 5B shows an alternative arrangement of the camera 402. The camera 402 may be mounted at a front end of the trailer 110. The camera 402 may be positioned to face the towing vehicle 100, such as a rear end of the towing vehicle 100. The features 104 may be part of, or disposed on, the rear end of the towing vehicle 100.

FIG. 6 shows a partial photograph of a towing vehicle 100 according to various embodiments. The towing vehicle 100 may include checkered rulers as the feature 104, arranged along a perimeter of the bed 408. Alternatively, the edges of the bed 408 may serve as the feature 104. The processor 802 may be configured to detect the edges of the bed 408, and determine their pixel positions.

FIG. 7 shows a flow diagram of a method 700 for determining position of a trailer according to various embodiments. The method 700 may include the method 200. The method 700 may further include at least one of processes 708, 710, 712, 714 and 716. In 708, the feature 104 in the input image 306' may be detected using the processor 802. In 710, the first vehicle may be positioned at a known position relative to the second vehicle. In 712, a reference image 306 of the first vehicle may be generated using the camera 402 mounted on the second vehicle. The reference image 306 may capture the feature 104 of the first vehicle. In 714, a pixel position of the feature 104 may be determined using the processor 802. In 716, position of the first vehicle relative to the second vehicle may be determined further based on the pixel position of the feature 104 in the reference image 306, and further based on the known position, using the processor 802.

According to an embodiment which may be combined with any above-described embodiment or with any below described further embodiment, the method 700 may further include the processes 710, 712, 714 and 716. The processes 710, 712 and 714 may generate a reference pixel position of the feature 104 that corresponds to the known position. The processor 802 may compare the pixel position of the feature 104 in the input image 306' to the reference pixel position. The processor 802 may determine at least one of distance and angle of the first vehicle relative to the second vehicle, based on the comparison.

According to an embodiment which may be combined with any above-described embodiment or with any below described further embodiment, at the known position, a centre line of the first vehicle may be aligned with a centre line of the second vehicle. This may serve as a reference, as the angle 120 is zero at this known position.

According to an embodiment which may be combined with any above-described embodiment or with any below described further embodiment, the method 700 may further include the process 708. The automatic detection of the feature 104 in the input image 306' by the processor 802 may improve the speed and accuracy of determining the trailer position.

According to an embodiment which may be combined with any above-described embodiment or with any below described further embodiment, the determined position may include yaw angle of the first vehicle relative to the second vehicle. The yaw angle may be useful information for the driver of the towing vehicle 100 for making turns. The driver may require this information to prevent the trailer 110 from colliding into other objects such as roadside structures or other vehicles.

According to an embodiment which may be combined with any above-described embodiment or with any below described further embodiment, the second vehicle may be the towing vehicle 100 and may include a hitch 102. The camera 402 may be mounted on the hitch 102.

According to an embodiment which may be combined with any above-described embodiment or with any below described further embodiment, the second vehicle may be the towing vehicle 100 and the camera 402 may be integrated in a CHMSL of the second vehicle. As the CHMSL camera may be a typical installation in a vehicle, no additional camera may be required for implementing the device 800.

According to an embodiment which may be combined with any above-described embodiment or with any below described further embodiment, the second vehicle may be the trailer 110 and may include a trailer coupler 112 for coupling to a hitch 102 of the towing vehicle 100. The camera 402 may be mounted on the trailer coupler 112.

According to an embodiment which may be combined with any above-described embodiment or with any below described further embodiment, the first vehicle may be the trailer 110 and may include a trailer coupler 112 for coupling to a hitch 102 of the towing vehicle 100. The feature 104 may be disposed on the trailer coupler 112.

According to an embodiment which may be combined with any above-described embodiment or with any below described further embodiment, the towing vehicle 100 may be a truck and the feature 104 may be disposed in a truck bed of the truck.

Figure 8:
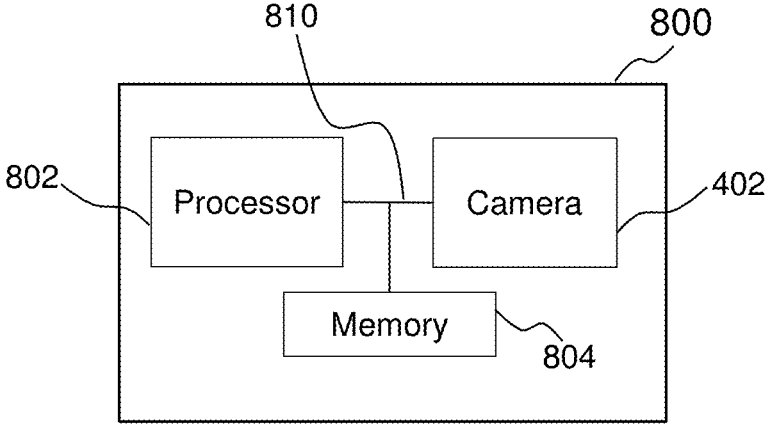
FIG. 8 shows a simplified block diagram of a device according to various embodiments.

FIG. 8 shows a simplified block diagram of a device 800 according to various embodiments. The device 800 may be used for determining position of a trailer 110. The device 800 may include a camera 402, and a processor 802. The camera 402 may be mountable on a second vehicle coupled to a first vehicle. One of the first vehicle and the second vehicle may be a trailer 110, and the other vehicle of the first vehicle and the second vehicle may be a towing vehicle 100. The towing vehicle 100 may be configured to tow the trailer 110. When in use, the camera 402 may be configured to generate an input image 306' of the first vehicle. The input image 306' may capture a feature 104 of the first vehicle. The processor 802 may be configured to determine a pixel position of the feature 104 in the input image 306'. The processor 802 may be further configured to determine position of the first vehicle relative to the second vehicle based on the pixel position of the feature 104 in the input image 306'. The processor 802, the camera 402 and the memory 804 may be coupled to one another via a connection 810. Various aspects described with respect to the methods 200 and 700 may also be applicable to the device 800.

According to an embodiment which may be combined with any above-described embodiment or with any below described further embodiment, the processor 802 may be further configured to detect the feature 104 in the input image 306'. For example, the processor 802 may employ image processing techniques, such as edge detection, and may use a trained neural network such as a convolutional neural network (CNN), to detect the feature 104. The automatic detection of the feature 104 in the input image 306' may improve the speed and accuracy of determining the trailer position.

According to an embodiment which may be combined with any above-described embodiment or with any below described further embodiment, the device 800 may further include a memory 804. The memory 804 may be configured to at least temporarily store the input image 306'. The processor 802 may access the input image 306' from the memory 804, for determining the pixel position of the feature 104 in the input image 306'.

According to an embodiment which may be combined with any above-described embodiment or with any below described further embodiment, the memory 804 may store a known position of the first vehicle relative to the second vehicle and the memory 804 may further store a pixel position of the feature 104 in a reference image 306 of the first vehicle. The reference image 306 may be generated using the camera 402 mounted on the second vehicle when the first vehicle is positioned at the known position. The processor 802 may access the pixel position of the feature 104 in the reference image 306 from the memory 804, for comparing it to the pixel position of the feature 104 in the input image 306'. The processor 802 may also access the known position from the memory 804, for determining the position of the first vehicle.

According to an embodiment which may be combined with any above-described embodiment or with any below described further embodiment, the processor 802 may be configured to determine the position of the first vehicle relative to the second vehicle further based on the pixel position of the feature 104 in the reference image 306 and further based on the known position.

According to an embodiment which may be combined with any above-described embodiment or with any below described further embodiment, at the known position, the centre line of the first vehicle may be aligned with a centre line of the second vehicle.

According to an embodiment which may be combined with any above-described embodiment or with any below described further embodiment, the determined position includes yaw angle of the first vehicle relative to the second vehicle.

According to an embodiment which may be combined with any above-described embodiment or with any below described further embodiment, the camera 402 may be one of a CHMSL camera and a rear view camera. As the CHMSL camera and the rear view camera may be typical installations in a vehicle, no additional camera may be required for implementing the device 800.

According to an embodiment which may be combined with any above-described embodiment or with any below described further embodiment, the processor 802 may be integrated with the camera 402. For example, the camera 402 may be a smart camera with its own processor.

According to an embodiment which may be combined with any above-described embodiment or with any below described further embodiment, the processor 802 may include an onboard processor disposed on one of the towing vehicle 100 and the trailer 110, and may further include a remote computer, for example, an offsite server located away from the vehicles, that communicates wirelessly with the onboard processor.

According to an embodiment which may be combined with any above-described embodiment or with any below described further embodiment, the processor 802 may include, or may be part of, the electronic control unit (ECU) of a vehicle.

Figure 9:
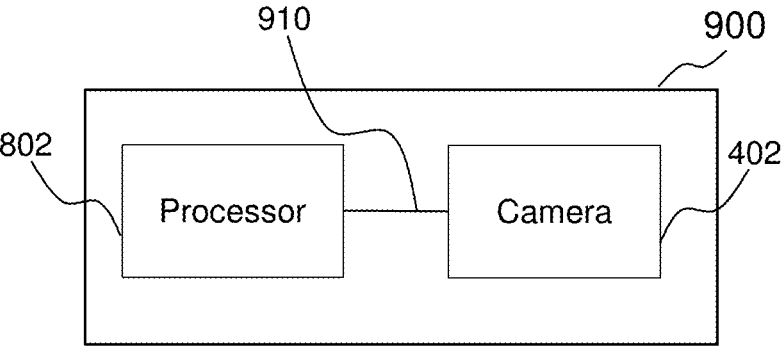
FIG. 9 shows a simplified block diagram of a vehicle according to various embodiments.

FIG. 9 shows a simplified block diagram of a vehicle 900 according to various embodiments. The vehicle 900 may be couplable to a further vehicle. The vehicle 900 may include the device 800. The vehicle 900 may include a camera 402 and a processor 802. The camera 402 may be configured to generate an input image 306' of the further vehicle when the further vehicle is coupled to the vehicle 900. The processor 802 may be configured to determine a pixel position of a feature 104 in the input image 306'. The processor 802 may be further configured to determine position of the further vehicle relative to the vehicle 900 based on the pixel position of the feature 104 in the input image 306'. The vehicle 900 may be one of a trailer 110 towable by the further vehicle, and a towing vehicle 100 configured to tow the further vehicle. The processor 802 and the camera 402 may be coupled to each other via a connection 910. Various aspects described with respect to the device 800, the methods 200 and 700 may also be applicable to the vehicle 900.

According to an embodiment which may be combined with any above-described embodiment or with any below described further embodiment, the camera 402 may be one of a CHMSL camera and a rear view camera.

According to an embodiment which may be combined with any above-described embodiment or with any below described further embodiment, the processor 802 may include, or may be part of, the electronic control unit (ECU) of the vehicle 900.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The word "exemplary" is used herein to mean "serving as an example, instance, or illustration." Any aspect described herein as "exemplary" is not necessarily to be construed as preferred or advantageous over other aspects. Reference to an element in the singular is not intended to mean "one and only one" unless specifically so stated, but rather "one or more." Combinations such as "at least one of A, B, or C", and "at least one of A, B, and C," include any combination of A, B, and/or C, and may include multiples of A, multiples of B, or multiples of C. Specifically, combinations such as "at least one of A, B, or C", and "at least one of A, B, and C," may be A only, B only, C only, A and B, A and C, B and C, or A and B and C, where any such combinations may contain one or more member or members of A, B, or C.

The foregoing description shall be interpreted as illustrative and not be limited thereto. One of ordinary skill in the art would understand that certain modifications may come within the scope of this disclosure. Although the different non-limiting embodiments are illustrated as having specific components or steps, the embodiments of this disclosure are not limited to those combinations. Some of the components or features from any of the non-limiting embodiments may be used in combination with features or components from any of the other non-limiting embodiments. For these reasons, the appended claims should be studied to determine the true scope and content of this disclosure.

The invention claimed is:

1. A method for determining positions of a trailer, the method comprising:

positioning a first vehicle at a known position relative to a second vehicle;

generating a reference image of the first vehicle using a camera mounted on the second vehicle, wherein the reference image captures a feature of the first vehicle;

determining a pixel position of the feature in the reference image using a processor;

subsequently, generating an input image of the first vehicle using the camera mounted on the second vehicle, wherein the input image captures the feature of the first vehicle, wherein one of the first vehicle and the second vehicle is a trailer, and wherein the other vehicle of the first vehicle and the second vehicle is a towing vehicle coupled to the trailer;

determining a pixel position of the feature in the input image, using the processor;

using the processor, determining the position of the first vehicle relative to the second vehicle further based on comparing the pixel position of the feature in the reference image to the pixel position of the feature in the input image.

2. The method of claim 1, wherein at the known position, a centre line of the first vehicle is aligned with a centre line of the second vehicle.

3. The method of claim 1, wherein the determined position comprises yaw angle of the first vehicle relative to the second vehicle.

4. The method of claim 1, wherein the second vehicle is the towing vehicle and comprises a hitch, and wherein the camera is mounted on the hitch.

5. The method of claim 1, wherein the second vehicle is the towing vehicle and wherein the camera is integrated in a center high mounted stop light of the second vehicle.

6. The method of claim 1, wherein the second vehicle is the trailer and comprises a trailer coupler for coupling to a hitch of the towing vehicle, and wherein the camera is mounted on the trailer coupler.

7. The method of claim 1, wherein the first vehicle is the trailer and comprises a trailer coupler for coupling to a hitch of the towing vehicle, and wherein the feature is disposed on the trailer coupler.

8. The method of claim 1, wherein the towing vehicle is a truck, and wherein the feature is disposed in a truck bed of the truck.

9. A device for determining position of a trailer, the device comprising:

a processor;

a camera mountable on a second vehicle coupled to a first vehicle, wherein one of the first vehicle and the second vehicle is a trailer, and wherein the other vehicle of the first vehicle and the second vehicle is a towing vehicle configured to tow the trailer, wherein in use, the camera is configured to, after the first vehicle is positioned at a known position relative to a second vehicle, generate a reference image of the first vehicle using the camera, wherein the reference image captures a feature of the first vehicle, and wherein the processor is configured to determine a pixel position of the feature in the reference image;

wherein subsequently, the camera is configured to generate an input image of the first vehicle, the input image capturing the feature of the first vehicle, and wherein the processor configured to determine a pixel position of the feature in the input image, and wherein the processor is further configured to determine the position of the first vehicle relative to the second vehicle based upon comparing the pixel position of the feature in the reference image to the pixel position of the feature in the input image.

10. The device of claim 9, wherein the processor is further configured to detect the feature in the input image.

11. The device of claim 9, further comprising:

a memory configured to at least temporarily store the input image.

12. The device of claim 11, wherein the memory stores the known position of the first vehicle relative to the second vehicle, and wherein the memory further stores the pixel position of the feature in a reference image of the first vehicle, wherein the reference image is generated using the camera mounted on the second vehicle when the first vehicle is positioned at the known position.

13. The device of claim 12, wherein at the known position, a centre line of the first vehicle is aligned with a centre line of the second vehicle.

14. The device of claim 9, wherein the determined position comprises yaw angle of the first vehicle relative to the second vehicle.

15. The device of claim 9, wherein the camera is one of a center high mounted stop light camera and a rear view camera.

16. A vehicle for coupling to a further vehicle, the vehicle comprising:

a camera configured to generate a reference image and subsequently an input image of a further vehicle when the further vehicle is coupled to the vehicle; and a processor configured to determine a pixel position of a feature in the reference image and subsequently determine a pixel position of the feature in the input image, and wherein the processor is further configured to determine the position of the vehicle relative to the further vehicle further based on comparing the pixel position of the feature in the reference image to the pixel position of the feature in the input image, wherein the vehicle is one of a trailer towable by the further vehicle, and a towing vehicle configured to tow the further vehicle.

17. The vehicle of claim 16, wherein the camera is one of a center high mounted stop light camera and a rear view camera.

* * * * *